Nov. 26, 1963   M. L. SLIMOVITZ   3,111,678
SEPARATE WRAP-AROUND FOREFINGER FOR GLOVE AND MITT
Filed Aug. 11, 1961   5 Sheets-Sheet 1

Morris L. Slimovitz
INVENTOR.

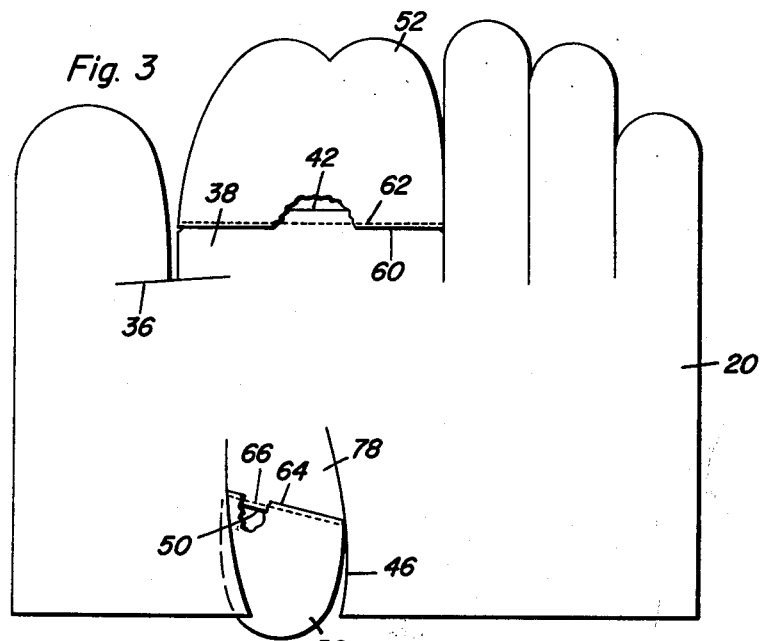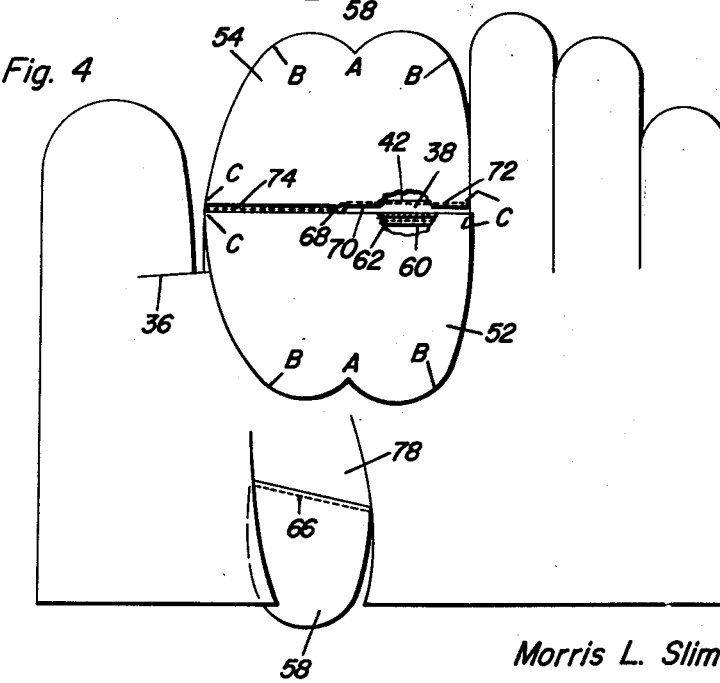

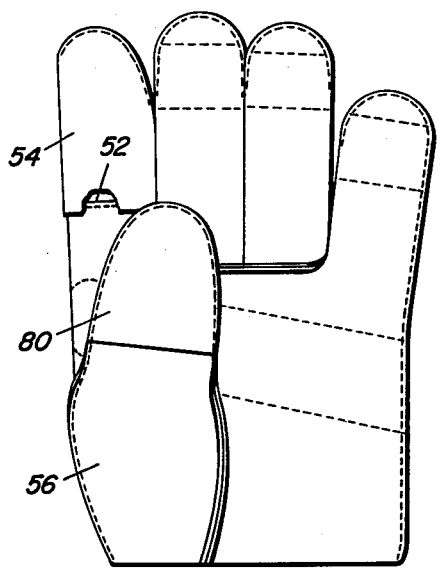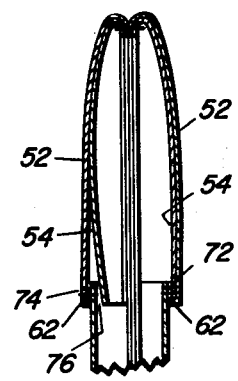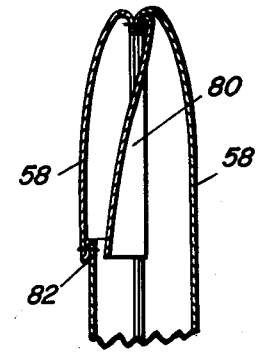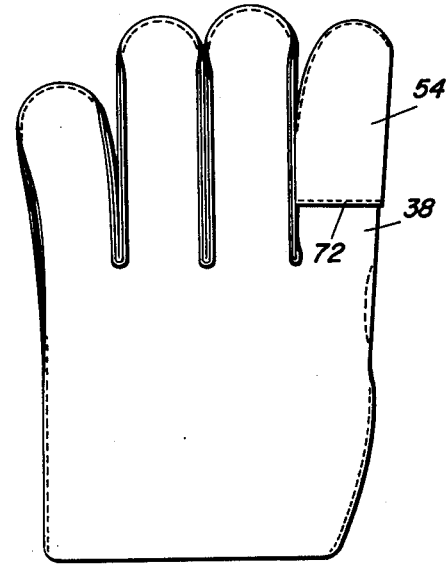

Nov. 26, 1963   M. L. SLIMOVITZ   3,111,678
SEPARATE WRAP-AROUND FOREFINGER FOR GLOVE AND MITT
Filed Aug. 11, 1961   5 Sheets-Sheet 4
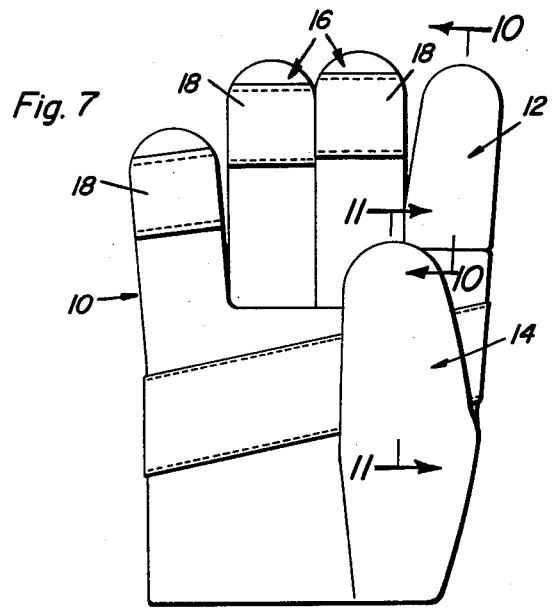
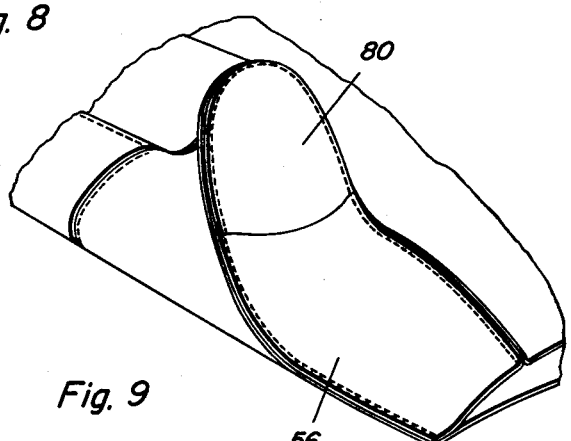
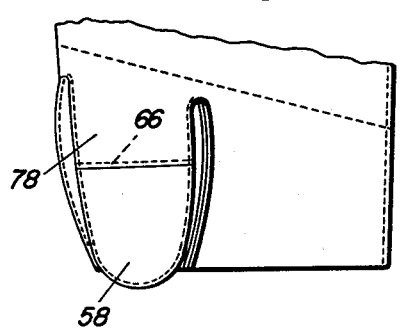
Morris L. Slimovitz
INVENTOR.

Nov. 26, 1963     M. L. SLIMOVITZ     3,111,678
SEPARATE WRAP-AROUND FOREFINGER FOR GLOVE AND MITT
Filed Aug. 11, 1961     5 Sheets-Sheet 5
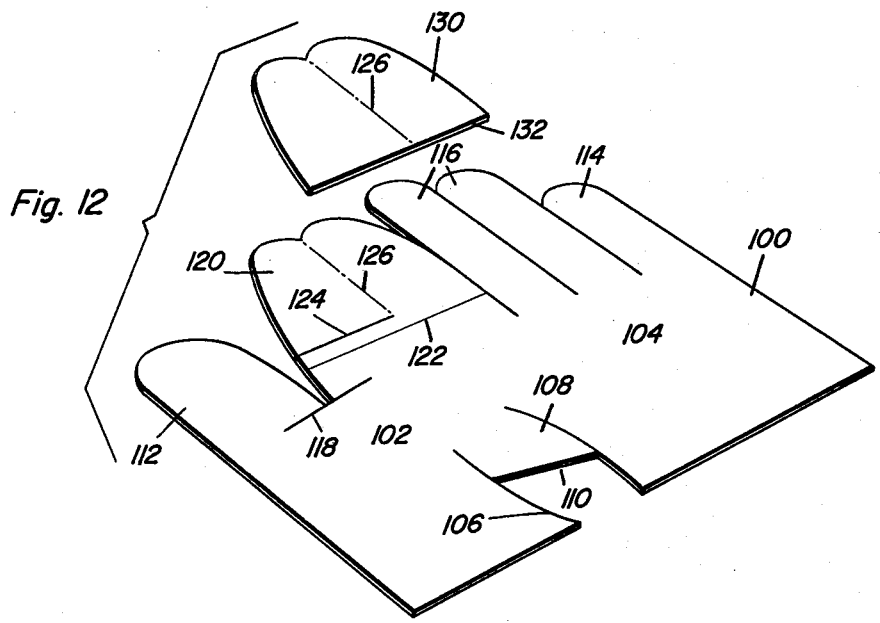
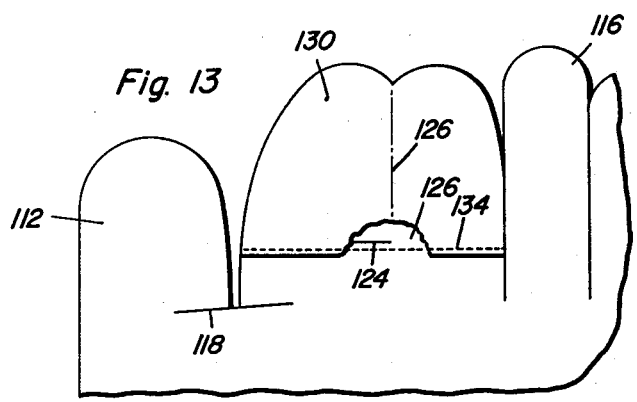
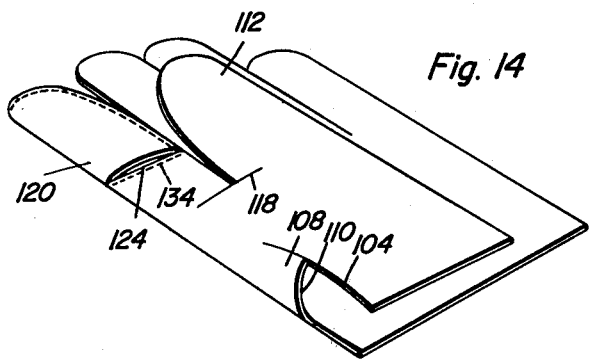
Morris L. Slimovitz
INVENTOR.

United States Patent Office 3,111,678
Patented Nov. 26, 1963

3,111,678
SEPARATE WRAP-AROUND FOREFINGER
FOR GLOVE AND MITT
Morris L. Slimovitz, % Morris Mfg. Co., P.O. Box 308, Newbern, Tenn.
Filed Aug. 11, 1961, Ser. No. 130,833
5 Claims. (Cl. 2—163)

This invention comprises a novel and useful separate wrap-around forefinger for glove and mitt and more particularly pertains to an improved glove construction containing subject matter which is common to and which subject matter comprises an improvement over the inventions disclosed and claimed in my prior Patent No. 2,728,082 of December 27, 1955 and my copending application Serial No. 130,188, filed August 8, 1961 for Dual Feel Glove and Mitt.

In the above identified prior patent there is disclosed and claimed a glove construction having an improved sensitivity of feel for the user through the provision of insert portions of a relatively thinner material which are inserted into the palm portions of the thumb and forefinger and possibly other portions of the glove in lieu of the usual material of the glove in order to obtain a much greater dexterity in the use of the fingers of the user and a sensitivity of feel while still completely enclosing and protecting the hand against the weather and other conditions. In the prior above identified application there is also disclosed a glove having somewhat similar characteristics to those of my prior patent and wherein an opening or passage is provided between the lining of the glove at selected finger portions thereof to enable the finger of the user to be inserted through this opening and into direct contact with the inside surface of the outer covering of the glove thereby securing a greater sensitivity of feel and a greater dexterity of use of the hands of the wearer while still completely enclosing and protecting the hands.

The present invention has as its primary object to improve the gloves of my above identified prior patent and copending application by obtaining therein a greater sensitivity of feel for the forefinger and thumb and possibly other fingers of the glove, and a greater dexterity of use of the fingers of the wearer while still fully enclosed within the glove, with a construction which shall be simpler and more economical to fabricate, and yet will obtain an improved fit of the glove upon the hand and greater comfort by the user.

A further and more specific object of the invention is to provide a glove construction in compliance with the foregoing objects in which there is provided a novel forefinger construction of the glove whereby the forefinger may be formed from a single separate piece of material, which latter may be of any preferred material and may be different from and entirely independent of the material of the rest of the glove, whereby a variety of individual characteristics may be imparted to the glove forefinger.

A further object of the invention is to provide a glove construction in which the forefinger thereof is capable of being formed from a separate piece of material from that of the rest of the glove and may be secured to the body of the glove in a simple and improved manner.

Yet another object of the invention is to provide a glove construction in accordance with the preceding objects wherein the forefinger of the glove may be formed from a single piece of material in a wrap-around operation.

An additional object of the invention is to provide a glove construction in compliance with the above mentioned objects in which the thumb stall of the glove shall be secured to the blank forming the body of the glove upon a diagonal or inclined line thereby obtaining a more comfortable position of the finger with respect to the palm of the glove.

Still another object of the invention is to provide a glove construction in accordance with the above mentioned objects wherein the forefinger of the glove and if desired a lining therefor are each formed from a separate piece of material thereby enabling the forefinger and liner to be of various materials differing from that of the glove and whereby the forefinger with or without a lining is formed by a wrap-around operation.

A still further object of the invention is the provide a glove in accordance with the above set forth objects wherein the forefinger may be formed of a separate piece of material with a wrap-around operation and with the separate piece of material providing a lining therefor and whereby the lining is so joined to the forefinger as to afford an opening at the base of the forefinger through which the finger of the user may be inserted between the lining and the body of the forefinger in order to obtain a greater sensitivity of feel.

Still another purpose of the invention is to provide a glove construction in which the thumb is formed of a separate piece of material, either lined or unlined and is attached to the glove in a novel manner to obtain an improved positioning of the thumb with respect to the palm of the glove.

Still another purpose of the invention is to provide a glove construction wherein the body of the glove may be formed of a single piece of material with a portion thereof shaped to provide and permit the forming of a forefinger therefrom in a wrap-around operation.

A further important object of the invention in accordance with the immediately preceding object is to provide a glove construction in which the body of the glove constitutes the lining of the forefinger and wherein a forefinger covering is secured to the blank from which the glove is formed and the forefinger is closed by wrap-around operation of the covering and lining of the forefinger.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a plan view showing one of the steps in the method of forming the glove in accordance with this invention, and with the leather covering of the forefinger being shown applied to the blank and with the thumb piece being applied to the blank in accordance with the present invention;

FIGURE 4 is a plan view showing a subsequent step to that of FIGURE 3 and indicating the application of the forefinger lining to the blank;

FIGURE 5 is an elevational view of the completed glove produced in accordance with the form of the invention shown in FIGURES 1-4, but with the glove turned inside out;

FIGURE 6 is a view of the backside of the glove of FIGURE 5 turned inside out;

FIGURE 7 is an elevational view of the palm of the completed glove of this form of the invention turned right side out;

FIGURE 8 is a detail perspective view showing the thumb stall portion of the glove but turned inside out;

FIGURE 9 is a further detail view in plan and the thumb portion of the glove turned inside out and with the thumb folded back towards the wrist portion of the glove;

Figure 1:
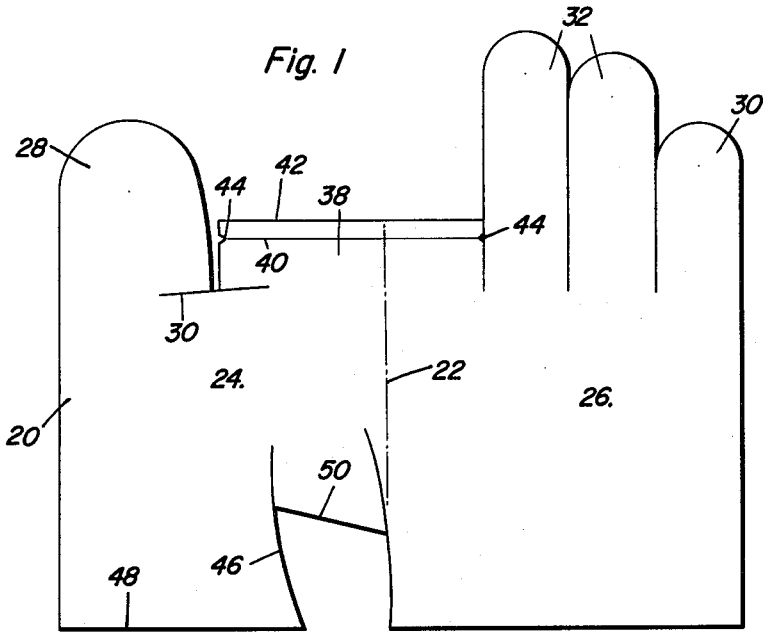
FIGURE 1 is a plan view showing a blank from which a heavy glove for obtaining maximum warmth is to be formed.

FIGURES 10 and 11 are detail views in vertical section taken substantially upon the planes indicated by the section lines 10—10 and 11—11 respectively of FIGURE 7 and showing the internal construction of the forefinger and thumb of the glove;

FIGURE 12 is a plan view showing the blank of the body of a modified construction of glove and of a forefinger covering therefor;

FIGURE 13 is a fragmentary plan view showing the covering of FIGURE 12 united to the blank thereof, parts being broken away; and FIGURE 14 is a perspective view showing a further step in the forming of the glove in accordance with this form of the invention.

*Embodiment of Figures 1–11*

Reference is made first to FIGURES 1–11 of the drawings which disclose an embodiment of glove possessing the characteristics of being formed of extra heavy material to provide maximum warmth while still attaining the desired sensitivity of feel for certain fingers of the glove.

Referring first to FIGURE 7 there is disclosed a right hand glove indicated generally by the numeral 10 which has a forefinger 12, a thumb 14, with the two middle fingers 16 being of a conventional gunn construction. In the palm of the glove shown in FIGURE 7 the numerals 18 designate insert pieces which are stitched into and fill cutaway portions of the little finger, second and third fingers of the palm, in the manner disclosed and claimed in my above identified prior patent in order to impart extreme sensitivity of feel thereto. The forefinger 12 in accordance with this invention is formed of separate pieces of material comprising a lining and a forefinger covering which are secured to each other and to the body of the glove in a novel manner, while the thumb 14 is likewise secured to the body of the glove in a novel manner so as to cause the thumb to lay in a slight incline across the palm thereby obviating the discomfort arising from the seams in the usual positioning of the thumb upon the body of a glove.

In this form of the invention the glove is illustrated as being unlined, that is, with the body of the glove being formed of a single piece of material to which the gunn, the thumb and the forefinger portions are separately attached without the provision of a lining other than the lining especially provided for the forefinger. It will be understood, however, that it is also within the purview of this invention to also provide in a glove of this character a conventional lining if this is desired.

Shown at 20 in FIGURES 1–4 is a single blank of suitable material such as heavy wool, leather or other material selected for contributing towards the primary purpose of the glove whether of warmth, resistance to heavy wear or other purposes.

Indicated at 22 in FIGURE 1 upon the one piece blank 20 is an imaginary line about which the blank is to be folded to thus provide the palm section 24 and the back section 26 of the blank and of the glove. As will be further observed the blank is provided with the customary projection 28 from which the front and side portions of the little finger are to be formed while a corresponding projection 30 on the blank section 26 comprises the back portion of the little finger. In addition, the two projections 32 comprise the back portions to the second and third fingers whose front portion or palm portion will be formed by the conventional gunn, the blank for which is shown at 34 in FIGURE 2. There is provided the customary slit in the blank as at 36 to which the gunn 34 is to be sewed and in accordance with this invention there is provided a further tab 38 lying between the portions 28 and 32 and extending across the fold line 22 of the blank. Indicated at 40 upon this tab at a spaced distance from the straight edge 42 thereof is a reference line for a purpose to be subsequently set forth, and there are provided the usual nicks 44 at the opposite ends of the tab and of the line 40 thereon for the purpose of orienting the forefinger portions of the glove.

Indicated upon the blank portion 24 is the usual thumb opening 46. However, in contrast with usual practice in which the inward edge of this thumb opening is along a line substantially parallel to that of the wrist edge 48 of the blank there is provided a diagonal or inclined edge 50 which in accordance with this invention gives to the thumb stall a different inclination with respect to the palm of the glove.

Figure 2:
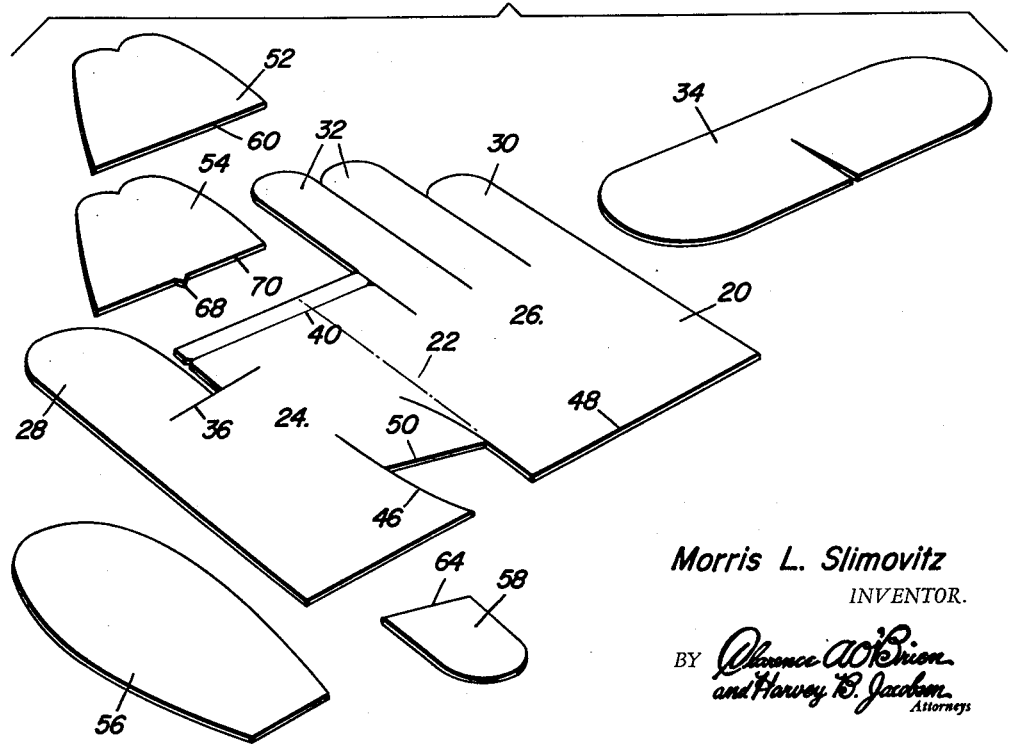
FIGURE 2 is a group perspective view showing the blank of FIGURE 1 with all of the components which are to be applied thereto to form the complete glove in accordance with this form of the invention.

Referring now to FIGURE 2 there are shown the various components which make up the body of this form of glove, including the blank 20, a forefinger cover 52 of leather or other material, a forefinger lining 54, a thumb stall piece 56 which forms the back of the thumb and the thumb piece 58 which forms a part of the front portion of the thumb.

All of the components shown in FIGURE 2 are preferably of the same material, that is, the material from which the body of the glove is to be formed except for the forefinger covering 52 which may be of leather or any other desired material, and the thumb piece 58 which is preferably of a relatively thin material to afford greater sensitivity of feel for the thumb. With this construction, there are obtained certain benefits and economies arising from the fact that the forefinger outer covering 52 and the forefinger lining 54 as well as the thumb piece 58 being formed separate from the rest of the glove body permit the use of special materials adapted to provide the maximum and optimum effectiveness of function, enabling the use of smaller pieces of material which may otherwise be scrap material and the like.

With the parts provided as shown in FIGURE 2 the method of constructing the glove in accordance with this form of the invention is as follows. With the blank 20 laid out as in FIGURE 3, the forefinger covering 52 is applied to the tab 38, the upper edge of this tab 42 being as indicated in FIGURE 3. The lower edge of the forefinger covering 60 is then placed along the tab 38 and is then stitched thereto by the line of stitching 62. In a similar manner, the edge 64 of the thumb piece 58 is stitched to the edge 50 of the thumb stall opening 46 by a line of stitching 66.

The next step in the operation as shown in FIGURE 4 is to fold the forefinger outer covering 52 downwardly about its stitched line 62 and to then apply the forefinger lining 54 to the exposed portion of the tab 38 just below the upper edge 42 thereof. For this purpose use is made of a small projection 68 at about the mid-portion of the straight lower edge 70 of the forefinger lining 54 to space the lower edge 70 of the forefinger lining a predetermined slight distance from the adjacent edge of the downturned forefinger covering 52. With the forefinger lining placed in the position shown in FIGURE 4, a line of stitching 72 is then sewed across the forefinger lining drawing the lower margin thereof to the tab 38 in parallel relation to the stitching which joins the forefinger covering to this tab, this line of stitching however at the projection 68 extending downwardly therefrom and then continuing across to form an angulated line of stitching 74.

A very important feature of this invention is in the stitchings 72, 74. It will be observed that the stitching 72 thus secures the right hand half of the forefinger lining to the tab 38, while the stitching 74 passes below the lower edge surface of the forefinger lining and is applied merely to the upper portion of the tab 38. Consequently, while the right hand portion of the lower edge 70 of the forefinger lining is secured to the tab, the left hand edge forming a continuation thereof is unsecured.

As the next operation in the forming of the glove, the covering 52 is folded up to lie across the lining 54.

Thereupon the left hand portion of the cover and lining are folded over upon the right hand portion thereof so that the rim portions A, B and C at the left hand portions of the forefinger cover and lining 52, 54 lie upon the correspondingly numbered portions at the right hand side thereof. With the two superposed linings being then folded upon themselves with the points A, B, C, being respectively in registration, the forefinger is closed by applying stitching from the point A through the point B and to the point C at the right hand side of FIGURE 4. It will be particularly noted, at this point, that although the cover and lining are now closed by the stitching extending from A to B to C, and the covering 52 is likewise secured by the seam 62 to the body of the glove, the lining 54 is not engaged by the stitching 74 and therefore the lining of the forefinger is secured only at its right portion to the tab or body of the glove while the folded or left hand portion has an opening therebetween. This opening is shown best in FIGURE 10 wherein it will be observed that although the forefinger covering 52 is completely secured to both the palm and back sections of the glove body by the stitching 62, only the back section of the lining 54 is so secured by the stitching 72, while the stitching 74 is ineffective to secure the left hand section or palm section of the lining to the palm section of the glove body. Thus there is provided an opening indicated by the numeral 76 which opening is of a length corresponding to the stitching 74 of FIGURE 4 and through which the forefinger may be selectively inserted.

With this construction therefore the forefinger may be inserted either entirely within the lining thus obtaining the effects of warmth of the lining as well as the protection of the outer covering in the forefinger, or alternatively may be inserted through the opening 76 and into the space between the lining and the outer covering at the palm of the glove. In this event the finger is in direct contact with the inside surface of the covering or body of the glove thereby having a greater sensitivity of feel because of the reduction in the thickness of the material overlying the finger.

After the forefinger has been closed, the gunn 34 which is of conventional design is applied in the conventional manner and is then closed to complete the second and third fingers 16 of the glove.

The thumb is completed by sewing the thumb stall 56 about the edges of the thumb stall opening 46, the thumb stall 56 comprising the back of the thumb while the tab 78 to which the thumb piece 58 was previously sewed comprises with this thumb piece the palm surface of the thumb. As previously mentioned, the thumb piece 58 is of a relatively thin material affording great sensitivity of feel to the thumb at the palm thereof.

It is also possible to employ a thumb lining, and for this purpose as shown in FIGURE 11 a thumb lining 80 is attached to the thumb in such a manner as to provide an opening 82 between this lining and the thumb piece 58. In this manner, as set forth and claimed in my above identified copending application, the user may selectively place the thumb either directly against the thumb piece 58 by passing the thumb through the opening 82 or may place the thumb to the right of the liner 80 so that both the liner and the thumb piece 58 overlie the thumb. Thus, the sensitivity of feel of the thumb may likewise be varied.

After these components have been secured to the body of the glove and seamed thereto, the usual finishing operation may be employed upon the glove as applying wrist band, ornamentation or the like as may be deemed desirable.

FIGURE 5 shows a view of the palm portion of the glove but turned inside out so that the inside surface of the body of the glove together with the lining 80 and its attachment to the inside surface of the thumb stall 56 will be readily apparent together with the forefinger lining 52. As viewed in the back view of the glove when turned inside out as in FIGURE 6, the forefinger lining 54 is readily seen as attached to the tab 38 by the seam 72.

FIGURES 8 and 9 render somewhat clearer, with the glove turned inside out, the structure of the thumb. In FIGURE 8 the thumb is shown in its natural position lying along the palm of the glove with the thumb lining 80 being shown secured to the thumb stall 56. In FIGURE 9, the end portion of the thumb is shown folded back upon itself to expose the palm surface of the thumb with the glove turned inside out.

It will be appreciated that in this form of the invention it is possible to form the forefinger of an entirely separate piece of material thereby rendering the material of the forefinger independent of the material of the rest of the body of the glove. Further, the forefinger lining is likewise a separate piece of material independent of the body or lining of the rest of the glove. Still further, the forefinger is formed with only a single seam extending from the tip of the forefinger along one side thereof, and with one of the seams drawing the forefinger to the tab in the body of the glove. Thus the seam along one side of the forefinger is completely eliminated rendering the glove more comfortable especially when the fingers are flexed.

Still further, the glove may be formed of a single thickness of material except for the presence of two pieces of material forming the forefinger. Further, the advantage of varying sensitivity of feel is obtained for both the forefinger and the thumb of the glove. Finally, the thumb itself by virtue of the diagonal cut of the edge 50 of the thumb notch 46, enables the thumb as shown in FIGURE 7 to lie upon a line which is inclined somewhat inwardly from the forefinger edge of the palm of the glove. In this normal position of the thumb with respect to the palm the fold is along the diagonal line 50 thus preventing wrinkling or bunching of the material at this fold and thereby again contributing to the comfort of the glove in use.

Embodiment of FIGURES 12–14

In the preceding embodiment there was disclosed an unlined glove formed of relatively heavy and extremely warm material to obtain the utmost in protection of the hand by the glove as to warmth or strength. In the embodiment of FIGURES 12–14 there is disclosed a much lighter form of glove which is therefore much more pliable and is of corresponding less warmth and protective ability for the hand. In this embodiment in contrast with the preceding form wherein both the forefinger and the forefinger lining were separate elements individually attached to the body of the glove, the forefinger lining is integral with the blank constituting the palm and back sections of the glove body while a separate piece constituting a forefinger covering is applied thereto.

In FIGURE 12, a blank 100 is illustrated which is quite similar to the blank 20 with one exception. In the blank 100 there is likewise provided a palm section 102 and a back section 104 with the palm section having the thumb notch 106 therein and with the tab 108 extending into this notch and being cut along a diagonal line 110 as in the preceding embodiment. There is further provided a projection 112 comprising the palm portion of the little finger, the corresponding projection 114 on the blank section 104 which comprises the back section of the little finger, the two projections 116 which will constitute the back sections of the second and third fingers, the slit 118 upon which the gunn, not shown, is to be attached to form the front sections or palm sections of the second and third fingers, together with a projection 120. This projection 120 has indicated thereon a reference line 122 which corresponds to the reference line 40 of the blank 20 and forms the same purpose. The portion 120, however, is of a greater extent that the tab 38 of the blank 20 in that its outer extremity is shaped to provide the forefinger component. However there is provided a slit 124 extending from one edge of the portion 120 above the reference line 122 to a fold line 126 disposed immediately of this portion indicated by the dot and dash line 126 in FIGURE 12.

The glove construction of FIGURES 12–14 includes the gunn, thumb stall and thumb piece components as described in connection with the form of FIGURES 1–11. Since these components are of identical construction previously described a further illustration and description of the same is deemed to be unnecessary. In addition, however, there is provided a further component 130 which constitutes the forefinger covering of the glove.

It will be noted in FIGURE 2 that the preceding form of the invention included a forefinger covering component 52 and a forefinger lining component 54. In this form of the invention, however, the lining component 120 is integral with the blank 100 and only the forefinger covering component 130 is provided which, however, may be identical with the component 52 of the preceding form.

As shown in FIGURE 13, the component 130 is placed upon the tab portion 120 so that the lower edge 132 of the forefinger covering lies along or in properly spaced relation to the reference line 122. The covering is then secured to the portion 120 by a line of stitching shown at 134. Thus the covering is secured along its entire lower edge to the portion 120. However, as will be noted from FIGURE 13, this line of stitching lies below the slit 124, which latter extends across the lining component to the medial center line 126 shown upon both the lining component and the cover component. Therefore, although the covering of the forefinger is secured along its entire base to the body of the glove, the lining is secured to the body of the glove only along the right hand of the lining, since the slit 124 separates the left hand of the lining from any connection with the body of the glove.

It will be understood that except for this difference the various components of the glove are assembled together in the same manner set forth in connection with the preceding embodiment.

When so assembled, the left hand portions of the forefinger covering 130 and of the lining component 120 are folded upon the line 126 so as to bring into registration the peripheries of these two components which are now seamed in the same manner as described in connection with the preceding form of the invention.

As a result of this construction, as shown in FIGURE 14, there is thus provided an opening between the folded over portion of the lining component 120 along the slit 124 which provides access for the finger of the user as desired.

Since the completion of this form of the glove except for the forming of the forefinger is identical with that previously described a further description is believed to be unnecessary.

It will of course be understood that both forms of the glove, the glove is sewed inside out and is finally turned right side out in readiness for use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A glove comprising a body including a palm and back, a forefinger secured to said body and consisting of a single piece of material folded upon itself to provide a forefinger front and back and closed by a single seam at one side extending from the tip and along said one side to the base of said forefinger, a forefinger lining consisting of a separate single piece of material folded upon itself within said forefinger and closed by said single forefinger seam, said lining having folded front and back portions closed by said single seam, the back portion of said lining being joined along its entire base edge to said body, the front portion of said lining being unattached along its base edge to said body thereby providing an opening for the forefinger to be disposed between the forefinger and its lining for increased sensitivity of feel.

2. A glove forefinger construction comprising a glove body having a forefinger tab projecting therefrom, a one-piece lining consisting of forefinger front and back portions, a seam securing said forefinger lining front and back portions to said tab, said forefinger lining being unattached to said tab along the front base edge of the forefinger, said forefinger lining being folded upon its medial line and having its edges closed from the tip to the base of the forefinger to provide a wrap-around forefinger lining thereby providing an opening at the base of the forefinger for receiving therethrough the forefinger of the wearer between the glove body and the forefinger lining for increasing sensitivity of feel.

3. A glove forefinger construction comprising a one-piece body comprising palm and back portions, a forefinger tab having a base on one of said portions and projecting therefrom for mounting a forefinger, a separate forefinger covering and a separate forefinger lining each having a base, a seam extending across the entire base of the forefinger covering and securing it to said tab, a second seam independently securing said forefinger lining along its base to said tab, said second seam engaging said tab solely from the medial portion of the tab base to one side of the tab, a transverse slit in said tab upon the distal end of said tab from said seams and extending towards the medial portion of the tab base from the other side of said tab, said covering and lining and tab being folded about their medial axis with their opposite edges joined to provide a wrap-around forefinger having an access opening at the base of the forefinger between the forefinger lining and covering.

4. The combination of claim 3 wherein said second seam comprises a line of stitching extending entirely across the base of the lining and with a portion of the stitching penetrating both the tab and lining and with the remainder of the stitching penetrating the lining but not the tab.

5. The combination of claim 4 wherein said portion of the stitching and said remainder of the stitching lie in parallel lines.

References Cited in the file of this patent

UNITED STATES PATENTS

| | | |
|---|---|---|
| 709,595 | Carson | Sept. 23, 1902 |
| 1,404,655 | Scharman | Jan. 24, 1922 |
| 1,673,517 | Kurz | June 12, 1928 |
| 1,875,441 | Gillian | Sept. 6, 1932 |
| 2,227,586 | Johnson | Jan. 7, 1941 |
| 2,356,032 | Chanut | Aug. 15, 1944 |
| 2,425,784 | Charney | Aug. 19, 1947 |
| 2,642,573 | Huck | June 23, 1953 |
| 2,785,412 | Zelenka | Mar. 19, 1957 |